(12) United States Patent
Green

(10) Patent No.: US 11,059,238 B2
(45) Date of Patent: Jul. 13, 2021

(54) METHOD OF REDUCING BURN-ON TIME

(71) Applicant: ROLLS-ROYCE plc, London (GB)

(72) Inventor: Christopher L Green, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/676,606

(22) Filed: Nov. 7, 2019

(65) Prior Publication Data

US 2020/0230895 A1 Jul. 23, 2020

(30) Foreign Application Priority Data

Dec. 6, 2018 (GB) ..................................... 1819913

(51) Int. Cl.
*B29C 70/30* (2006.01)
*B29C 70/06* (2006.01)
(Continued)

(52) U.S. Cl.
CPC .............. *B29C 70/30* (2013.01); *B29C 70/06* (2013.01); *B32B 3/02* (2013.01); *F01D 5/28* (2013.01); *B29C 66/721* (2013.01); *B29C 67/0044* (2013.01); *B29C 70/545* (2013.01); *B32B 5/26* (2013.01); *B32B 2260/023* (2013.01); *F05D 2230/10* (2013.01); *F05D 2230/50* (2013.01);
(Continued)

(58) Field of Classification Search
CPC ... B29C 67/0044; B29C 70/06; B29C 70/545; B29C 66/721; B29C 70/30; B32B 3/02–3/06; B32B 2307/3065; B32B 5/26; B32B 2260/023; F05D 2300/603–6034; F05D 2230/10; F05D 2230/50
See application file for complete search history.

(56) References Cited

U.S. PATENT DOCUMENTS

| 5,225,738 | A | 7/1993 | Ramaiah et al. |
| 6,479,124 | B1 * | 11/2002 | Porte ...................... B64D 29/00 428/68 |

(Continued)

FOREIGN PATENT DOCUMENTS

| EP | 2946078 A2 | 11/2015 |
| EP | 3 098 062 A1 | 11/2016 |

(Continued)

OTHER PUBLICATIONS

Apr. 23, 2020 Extended European Search Report issued in European Patent Application No. 19207361.7.
(Continued)

*Primary Examiner* — Matthew P Travers
(74) *Attorney, Agent, or Firm* — Oliff PLC

(57) ABSTRACT

A method of reducing a burn-on time of a composite component including a body comprising a plurality of fibres layered between a front face of the body and a rear face of the body within a matrix material, wherein the body comprises an edge face between the front face and the rear face at least partially formed by edges of the layers of fibres. The method comprising shaping an edge portion of the body in order to control a local concentration of vapours from the matrix material at the edge face of the body, the vapours having been produced during heating of the composite component and having passed between the layers of fibre of the body to the edge face.

13 Claims, 6 Drawing Sheets

(51) Int. Cl.
*B32B 3/02* (2006.01)
*B32B 5/26* (2006.01)
*B29C 70/54* (2006.01)
*B29C 67/00* (2017.01)
*F01D 5/28* (2006.01)
*B29C 65/00* (2006.01)

(52) U.S. Cl.
CPC ............ *F05D 2300/603* (2013.01); *F05D 2300/6034* (2013.01)

(56) References Cited

U.S. PATENT DOCUMENTS

| | | | |
|---|---|---|---|
| 8,480,935 B2 | 7/2013 | Partington et al. | |
| 2006/0251847 A1* | 11/2006 | Hethcock | B32B 7/08 |
| | | | 428/58 |
| 2007/0215232 A1* | 9/2007 | Hassonjee | B32B 5/26 |
| | | | 139/425 R |
| 2011/0008587 A1 | 1/2011 | Ruskin | |
| 2011/0143081 A1 | 6/2011 | Fritz et al. | |
| 2013/0061541 A1* | 3/2013 | Taylor | B29C 67/0014 |
| | | | 52/108 |
| 2013/0202430 A1 | 8/2013 | Gaudry et al. | |
| 2014/0044539 A1* | 2/2014 | Harada | B29C 65/562 |
| | | | 415/214.1 |
| 2015/0343716 A1* | 12/2015 | Feeney | B29C 70/545 |
| | | | 264/101 |
| 2018/0209298 A1* | 7/2018 | Binsberger | F01D 25/04 |

FOREIGN PATENT DOCUMENTS

| | | | |
|---|---|---|---|
| FR | 2970897 A1 * | 8/2012 | ............ F01D 5/282 |
| GB | 2 084 512 A | 4/1982 | |
| GB | 2526321 A | 11/2015 | |
| JP | H09-242957 A | 9/1997 | |
| WO | 2006/015598 A1 | 2/2006 | |
| WO | 2014/143340 A2 | 9/2014 | |
| WO | 2018/154312 A1 | 8/2018 | |

OTHER PUBLICATIONS

Jun. 6, 2019 Search Report issued in Great Britain Patent Application No. 1819913.3.

* cited by examiner

METHOD OF REDUCING BURN-ON TIME

CROSS-REFERENCE TO RELATED APPLICATIONS

This specification is based upon and claims the benefit of priority from United Kingdom patent application number GB 1819913.3 filed on Dec. 6, 2018, the entire contents of which are incorporated herein by reference.

BACKGROUND

Field of the Disclosure

The present disclosure relates to a method of reducing a burn-on time of a composite component.

Description of the Related Art

During testing of composite components for gas turbine engines the components are tested to determine how long the component continues to burn, e.g. produce a flame, after an external heat source has been removed from the component. The time taken for the flame to extinguish is referred to as the "burn-on time". It is desirable for the burn-on time of composite components to be reduced.

SUMMARY

According to a first aspect, there is provided a method of reducing a burn-on time of a composite component after the composite component has been heated, wherein the composite component comprises a body comprising a plurality of fibres layered between a front face of the body and a rear face of the body within a matrix material, wherein the body comprises an edge face between the front face and the rear face at least partially formed by edges of the layers of fibres, wherein the method comprises:
   shaping an edge portion of the body in order to control, e.g. reduce, a local concentration of vapours from the matrix material at the edge face of the body, the vapours having been produced during heating of the composite component and having passed between the layers of fibre of the body to the edge face.

The edge portion may comprise the edge face. The edge portion may further comprise a portion of the body adjacent, e.g. immediately adjacent, to the edge face that is shaped or otherwise treated in order to reduce burn-on time. Burn-on time may be the time a flame continues to burn after an external source of heat has been removed.

Shaping the edge portion may comprise forming the body such that positions of the edges of two or more of the layers of fibres are staggered in a direction parallel to the front face of the body, such that at least a portion of the edge face is formed at an non-perpendicular angle relative to the front face.

The edge face or portion thereof may be formed at an angle of between 15 degrees and 60 degrees relative to the front face.

The edge portion may be shaped by layering the fibres of the body such that the edges of two or more of the layers of fibres are staggered in a direction parallel to the front face of the body, e.g. prior to curing the composite component. Additionally or alternatively, the edge portion may be shaped by machining the edge face after the body of the composite component has been formed, e.g. cured.

Shaping the edge portion of the body may comprise bending or folding the body of the composite component out of a plane of the front face to form a bend portion extending along a length of the edge portion, e.g. along a length of the edge face. The bend portion may create a rim or overlap at the edge.

The bend portion may extend along the body parallel to the edge face. The body may be bent through an angle of approximately 90 degree at the bend portion. Alternatively, the body may be bent through an angle of less than 90 degrees at the bend portion. Alternatively again, the body may be bent through an angle of greater than 90 degree at the bend portion. For example, the body may be bent through an angle of approximately 180 degrees at the bend portion, e.g. such that the body is bent or folded back on itself at the bend portion.

The method may further comprise providing an edge cap extending around the edge face. The edge cap may extend at least partially over the front face and the rear face. The edge cap may be resilient and may resist separation of the layers of fibres forming the body by virtue of its resilience. The edge cap may be adhered to the body, e.g. at the front face, rear face and/or the edge face. The edge cap may comprise a layer of fibres and associated matrix material positioned over the layers of fibres forming the body. The edge cap may comprise an intumescent coating or paint, a ceramic material, such as fire cement or a ceramic adhesive, or a metallic material, such as titanium.

The method may further comprise installing one or more fasteners, such as rivets, nuts and bolts or any other fasteners, passing through the layered fibres of the body, such that the fasteners act to resist separation of the layers of fibres at the edge face. The fastener may comprise first and second opposing shoulders abutting the front face and/or the rear face of the body. The fasteners may be installed adjacent to the edge, e.g. in the edge portion. The fasteners may be spaced apart along a length of the edge face. The fasteners may be arranged in a line parallel to the edge face. The fasteners may pass through the edge cap, e.g. the portion of the edge cap extending over the front face and/or the rear face of the body.

The method may further comprise providing a strip of resilient material, e.g. a metallic material, such as titanium, over the front and/or rear faces of the body. The strip of resilient material may extend at least partially along the length of the edge face. The fasteners may pass though the strip of resilient material. The strip of resilient material may be provided over the end cap or between the end cap and the body.

The fasteners may pass though the body at the bend portion, on one side of the bend portion, e.g. between the bend portion and the edge face or on an opposite side of the bend portion to the edge, or at both sides of the bend portion, e.g. if the body is bent or folded back on itself at the bend portion.

The edge portion may be shaped such that the edge face has an undulating profile along the length of the edge face. The profile of the edge face may undulate in a direction parallel to a plane of the front face, e.g. in a direction perpendicular to the direction in which the edge face extends.

The composite component may be a support structure for an electrical component of the gas turbine engine, such as a printed circuit board and/or an electronic controller of the gas turbine engine.

According to another aspect, there is provided a composite component for a gas turbine engine, the component comprising a body, wherein the body comprises a plurality of fibres layered between a front face of the body and a rear face of the body, wherein the body comprises an edge face formed between the front face and the rear face by edges of the layers of fibres, and wherein the positions of the edges of two or more of the layers of fibres are staggered in a direction parallel to the front face of the body, such that at least a portion of the edge face is formed at an non-perpendicular angle relative to the front face.

According to another aspect, there is provided a method of reducing a burn-on time of a composite component after the composite component has been heated, wherein the composite component comprises a body comprising a plurality of fibres layered between a front face of the body and a rear face of the body within a matrix material, wherein the body comprises an edge face between the front face and the rear face at least partially formed by edges of the layers of fibres, wherein the method comprises:

applying a fire retarding treatment to an edge portion of the of the body in order to control, e.g. reduce, a local concentration of vapours from the matrix material at the edge face of the body, the vapours having been produced during heating of the composite component and having passed between the layers of fibre of the body to the edge face.

Applying the fire retarding treatment may comprise shaping the edge portion of the body, providing an edge cap extending around the edge face, providing a strip of resilient material over the front and/or rear faces of the body and/or installing one or more fasteners passing through the layered fibres of the body, such that the fasteners act to resist separation of the layers of fibres at the edge face.

An assembly for an electrical system for a gas turbine engine may comprise the above-mentioned composite component and an electrical component coupled to, e.g. mounted on, the body of the composite component. The electrical component may comprise a printed circuit board. Additionally or alternatively, the electrical component may comprise an electronic controller of the gas turbine engine. The electronic controller may be mounted on the printed circuit board.

According to another aspect, there is provided a method of manufacturing a composite component for a gas turbine engine, the method comprising the steps of:

layering a plurality of fibres to form a body of the composite component, the fibres being layered between a front face and a rear face of the body, wherein an edge face is formed between the front face and the rear face, wherein the edge face is at least partially formed by edges of the layers of fibres;
curing the composite component; and
shaping an edge portion of the body to control a local concentration of vapours from the matrix material at the edge face of the body during heating of the composite component, the vapours having passed between the layers of fibres of the body to the edge face.

For example, the composite component may be manufactured such that the positions of the edges of two or more of the layers of fibres forming the edge face are staggered in a direction parallel to the front face of the body, such that at least a portion of the edge face is formed at a non-perpendicular angle relative to the front face Shaping the edge portion may comprise layering the fibres such that the positions of the edges of two or more of the layers of fibres are staggered in a direction parallel to the front face of the body, such that the edge face, or portion thereof, is formed at a non-perpendicular angle relative to the front face. Additionally or alternatively, shaping the edge portion may comprise machining the composite component such that the two or more of the layers of fibres forming the edge face are staggered in the direction parallel to the front face of the body, such that the edge face, or portion thereof, is formed at a non-perpendicular angle relative to the front face.

According to another aspect, there is provided a method of manufacturing a composite component for a gas turbine engine, wherein the method comprises:

layering a plurality of fibres to form a body of the composite component, the fibres being layered between a front face and a rear face of the body, wherein an edge face is formed between the front face and the rear face, wherein the edge face is at least partially formed by edges of the layers of fibres; and
curing the composite component, wherein the composite component is manufactured such that the positions of the edges of two or more of the layers of fibres forming the edge face are staggered in a direction parallel to the front face of the body, such that at least a portion of the edge face is formed at a non-perpendicular angle relative to the front face According to another aspect, there is provided a gas turbine engine for an aircraft, wherein the gas turbine engine comprises:

an engine core comprising a turbine, a compressor, and a core shaft connecting the turbine to the compressor;
a fan located upstream of the engine core, the fan comprising a plurality of fan blades; and the above-mentioned composite component or the above-mentioned assembly.

The composite component or assembly may be part of an ancillary system of the gas turbine engine. The composite component or assembly may be provided about the engine core.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above).

Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
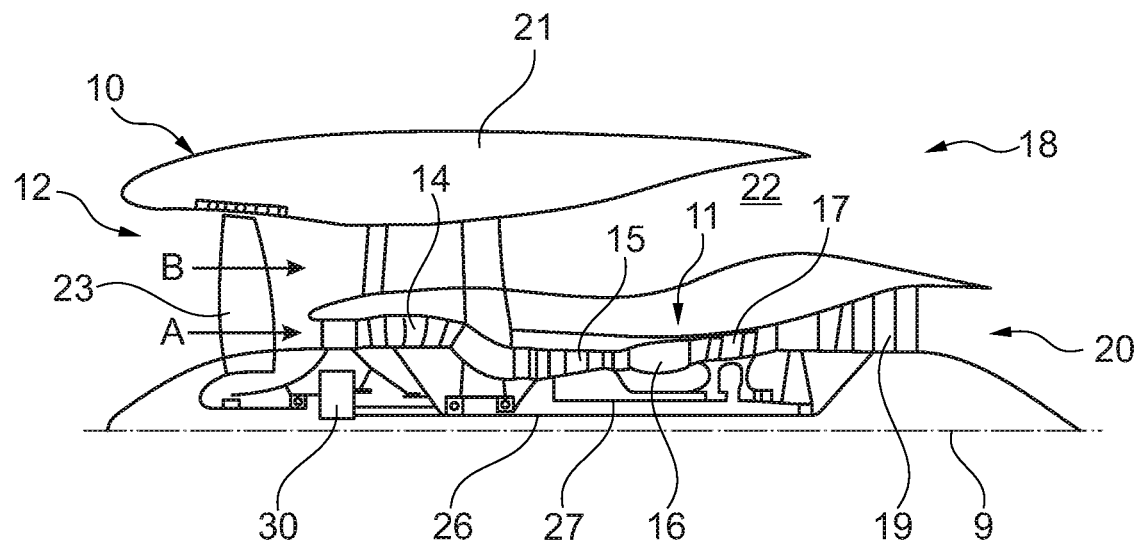
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
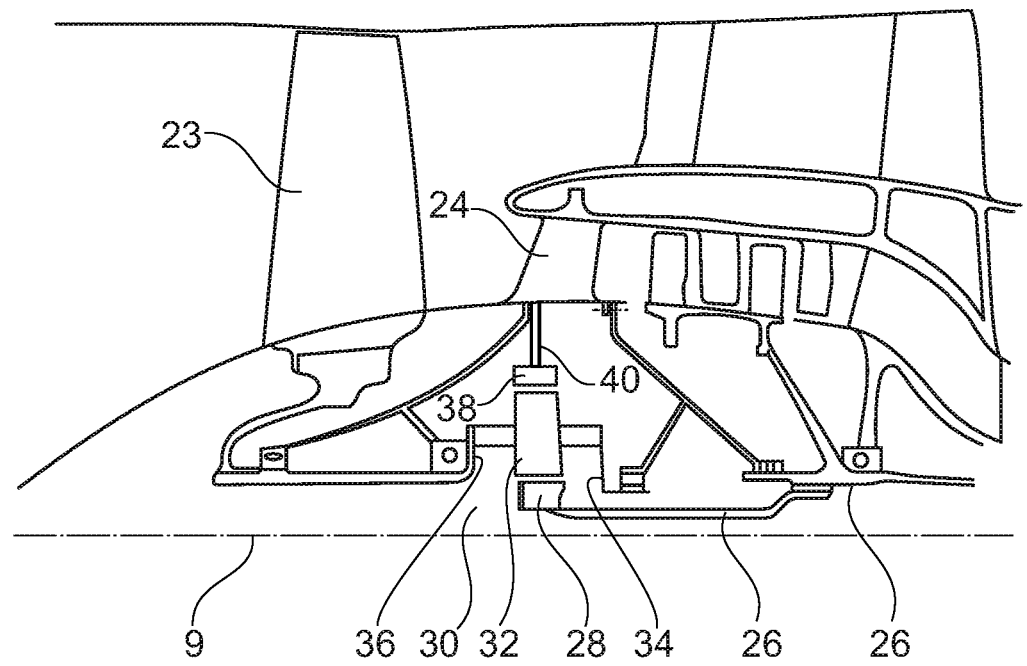
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

It will be appreciated that the arrangement shown in FIG. 2 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 3:
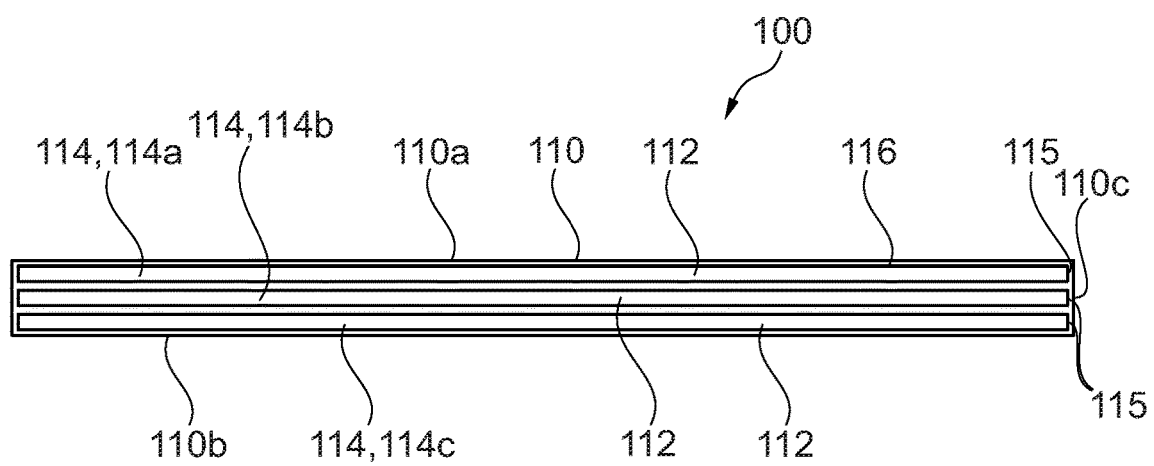
FIG. 3 is a schematic cross-sectional view of a composite component prior to heating.

One or more components of the gas turbine engine 10 may be manufactured from a composite material, such as a carbon fibre reinforced polymer material. With reference to FIG. 3, a composite component 100 for a gas turbine engine 10 comprises a body 110 comprising a plurality of fibres 112, e.g. carbon fibres, layered between a front face 110a of the body and a rear face 110b of the body.

In the arrangement shown in FIG. 3, the fibres 112 are layered within the composite component to form three layers 114, e.g. a first layer 114a, a second layer 114b and a third layer 114c. However, in other arrangements, the body 110 may comprise any other number of layers. The fibres 112 are embedded within a matrix material 116, such a polymer resin, e.g. a thermoset or thermoplastic polymer resin.

The body 110 comprises an edge face 110c formed between the front and rear faces 110a, 110b. As depicted in FIG. 3, the edge face 110c is at least partially formed by edges 115 of the layers of fibres (which may be covered by the matrix material 116).

It may be desirable for the composite components and structures of the gas turbine engine 10 to be fire resistant or fire proof. Burn-on time is the time taken from a component to stop burning, e.g. stop producing a flame, after an external heat source, which was sufficient to cause combustion of the component material, has been removed from the component. Burn-on time is one parameter that can be used to quantify how fire resistant a component is. It may be desirable for the burn-on time of composite components of the gas turbine engine to be reduced or minimised. For example, it may be desirable for burn-on time of the components to be less than approximately 2 seconds or less than approximately 1 second.

When composite components, such as the composite component 100, are exposed to an external heat source, the matrix material 116 can evaporate, sublime and/or thermally decompose to produce a vapour. The vapour may be contained between the layers 114 of the fibres 112 and may pass between the layers 114 to reach an edge of the body, where the vapour may be released, e.g. from the edge face 110c.

The vapour produced by heating the matrix material 116 may be flammable, and hence, whilst an external heat source is applying a sufficient amount of heat to the component, the vapours being released from the composite component 100 may ignite to produce a flame.

When the external heat source is removed, the burning vapour may continue to heat the body 110 of the composite component 100 causing more vapour to be produced. Because the vapour passes between the layers of fibres and is released at the edge face, a concentration of the vapour at the edge face, e.g. a local concentration at one or more positions along the edge face, can be sufficient to sustain a flame, increasing the burn-on time. In some arrangements, the concentration of vapours at the edge face may produce an approximately stoichiometric mixture of vapours and oxygen for a combustion reaction of the vapours at the edge.

Figure 4:
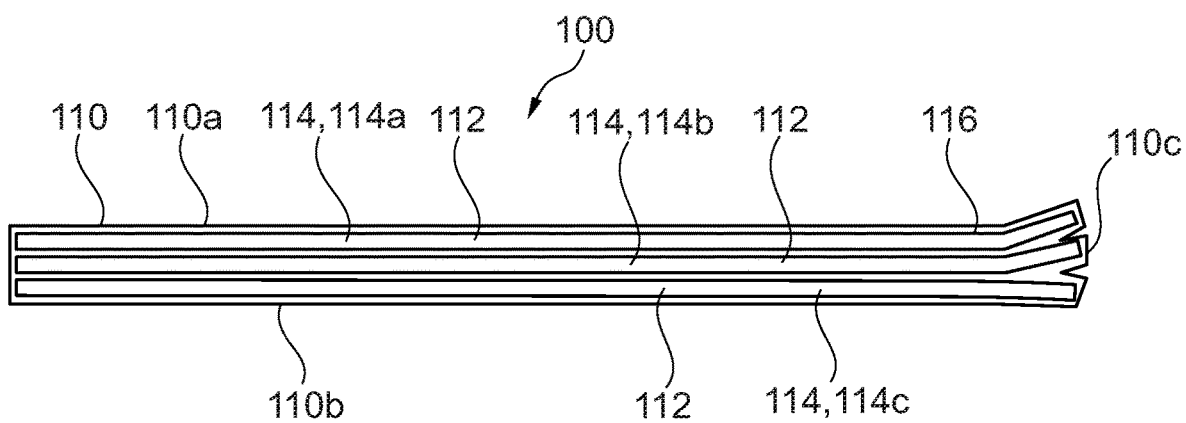
FIG. 4 is a schematic cross-sectional view of a composite component following heating.

With reference to FIG. 4, the layers 114 of fibres in the body 110 may become partially separated from one another or "lofted" due to the heat of combustion at the edge. Lofting of the layers 114 of the composite body 110 may allow more air between the layers 114, which may encourage combustion of the vapours.

Figure 5:
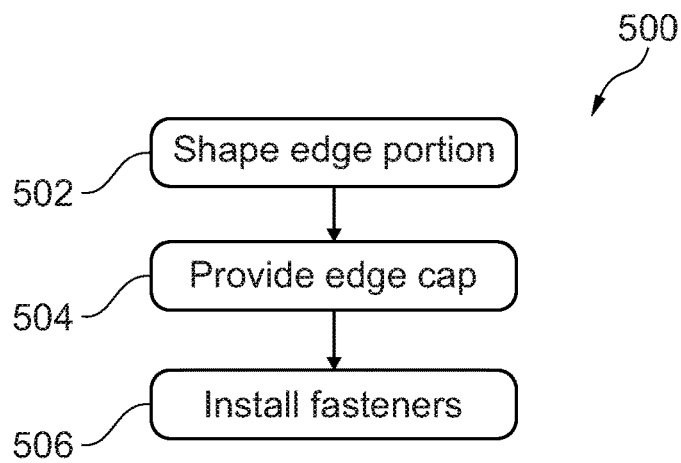
FIG. 5 is a flow chart illustrating a method of reducing burn on of a composite component.

With reference to FIG. 5, the composite component 100 may be treated according to a method 500 in order to reduce the burn-on time of the composite component. The method 500 comprises a first step 502, in which a fire retarding treatment is applied to an edge portion of the of the body in order to control, e.g. reduce, a local concentration of vapours from the matrix material at the edge face of the body, such that the concentration of vapours is insufficient for combustion to be sustained when the external heat source is removed For example, the edge portion of the body may be shaped, as described below, in order to control the local concentration of vapours from the matrix material at the edge face 110c of the body.

Figure 6:
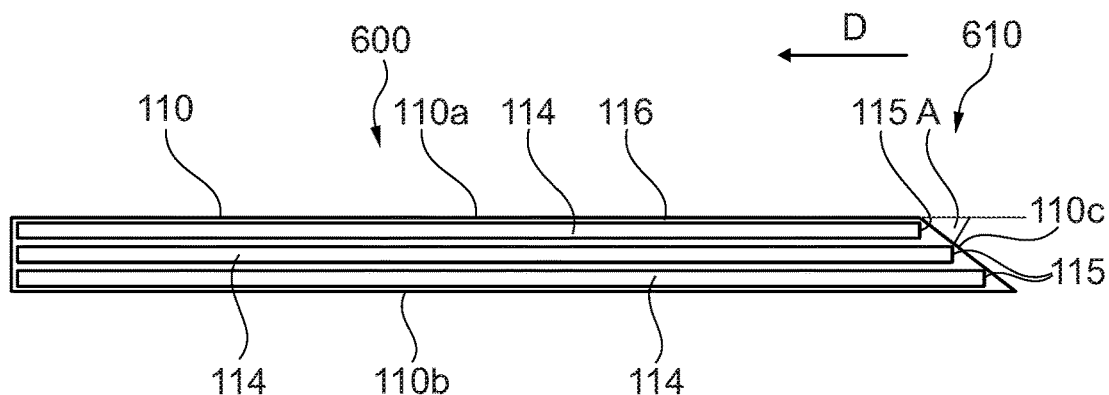
FIG. 6 is a schematic cross-sectional view of a composite component according to the present disclosure.

With reference to FIG. 6, a composite component 600 treated according to the method 400 will now be described. The composite component is similar to the composite component 100 described above and comprises a body 110 comprising a plurality of layers 114 of fibres 112 that are layered between a front face 110a and a rear face 110b of the body 110 within a matrix material 116. Edges 115 of the layers 114 of fibres at least partially form an edge face 110c of the body 110.

The composite component differs in that an edge portion 610 of the body 110 is shaped such that positions of the edges 115 of two or more of the layers 114 of fibres forming the body 110 are staggered in a direction D parallel to the front face 110a of the body. By staggering the layers 114 of the fibres 112 at the edge portion 610 in this way, at least a portion of the edge face 110c is formed at a non-perpendicular angle relative to the front face 110a.

As depicted, the edge portion 610 may comprise the edge face 110c. Additionally, the edge portion 610 may comprise a portion of the body 110 adjacent, e.g. immediately adjacent, to the edge face 110c that is treated, e.g. shaped, in order to control the concentration of vapours.

As depicted in FIG. 6, an angle A of the edge face 110c relative to the front face 110a may be approximately 45 degrees. In other arrangements, the angle A may be between 15 degrees and 60 degrees.

The edge portion 610 may be shaped by machining the edge portion after the body 110 of the composite component 100 has been formed, e.g. after the body has been cured. In other words, the edge face 110c may be cut using a cutting tool, e.g. a machining tool, such as a milling tool, after the body 110 has been cured.

Alternatively, the edge portion 610 may be shaped by layering the fibres 112 of the body 110, e.g. prior to curing of the body 110, to form the edge face 110c into the desired shape. For example, the fibres 112 of the body 110 may be layered such that the edges 115 of two or more of the layers 114 of fibres are staggered in the direction D parallel to the front face 110a of the body at the edge face 110c.

Forming the edge face 110c at a non-perpendicular angle relative to the front face 110a increases the area over which the vapours from the matrix material 116 are released from the body 110. As a result, local concentrations of the vapours at positions along the edge face 110c are reduced. In particular, the local concentrations of the vapours may be reduced to an extent that the concentration of vapour is insufficient to sustain a flame at the edge.

Figure 7A:
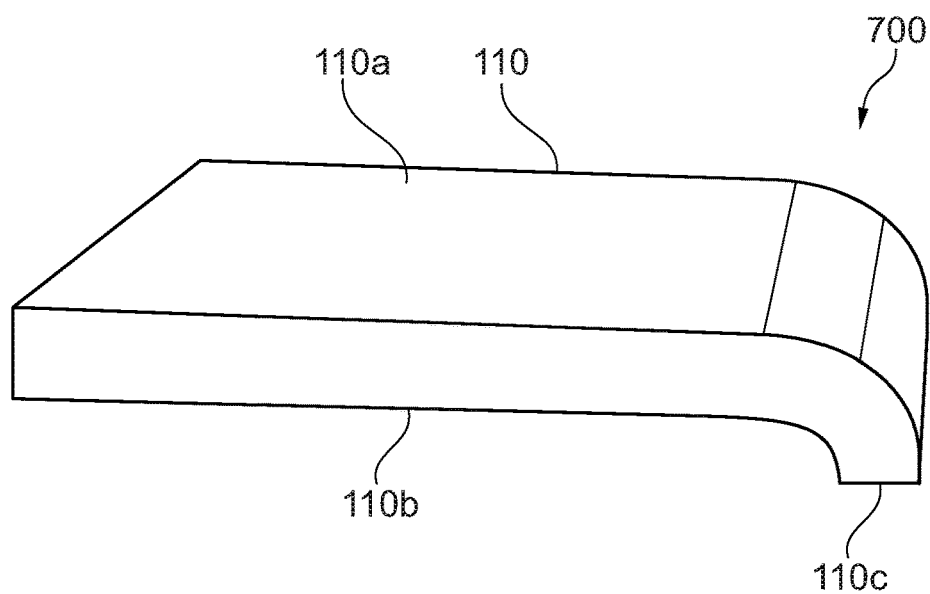
FIG. 7a is a schematic perspective view of another composite component according to the present disclosure.
Figure 7B:
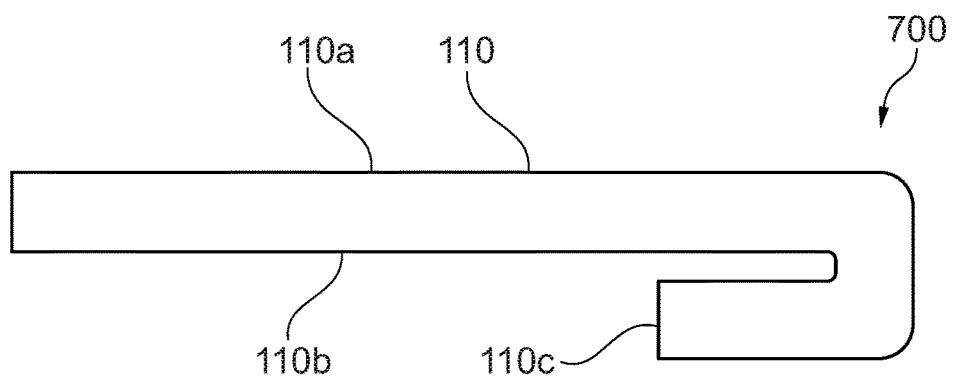
FIG. 7b is a schematic cross-sectional view of another composite component according to the present disclosure.

With reference to FIGS. 7a and 7b, shaping the edge portion of the body 110 may comprises bending or folding the body 110 of the composite component out of a plane of the front face 110a to form a bend portion 700. The bend portion may extend at least partially along the length of the edge face 110c.

As shown in FIG. 7a, the body 110 may be bent through an angle of approximately 90 degrees at the bend portion 700. In other words, the body 110 may be turned down, e.g. to create a rim along the edge. Alternatively, as depicted in FIG. 7b, the body 110 may be bent through an angle of greater than 90 degrees, such as approximately 180 degrees at the bend portion 700, e.g. such that the body is bent or folded back on itself at the bend portion 700.

The presence of the bend portion 700 may act to restrict the passage of vapours between the layers 114 to the edge face 110c, e.g. by creating a tortuous path for the vapour passing towards the edge. The bend portion 700 may therefore reduce the amount of vapour passing between the layers to reach the edge face 110c and may thereby reduce the concentration of vapours at the edge face 110c.

In the arrangement shown in FIGS. 7a and 7b, the edge face 110c of the body 110 is formed substantially perpendicularly to the front face 110a at the edge. However, in other arrangements, the edge face 110c of the body 110 may be formed at a non-perpendicular angle relative to the front face 110a, e.g. as described above with reference to FIG. 6, in addition to the bend portion 700 being formed on the body 110.

Returning to FIG. 5, the method 500 may comprise a second step 504 in which an edge cap 800 (depicted in FIG. 8) is provided at the edge portion 610, around the edge face 110c of the body, e.g. covering at least a portion of the edge face.

Figure 8:
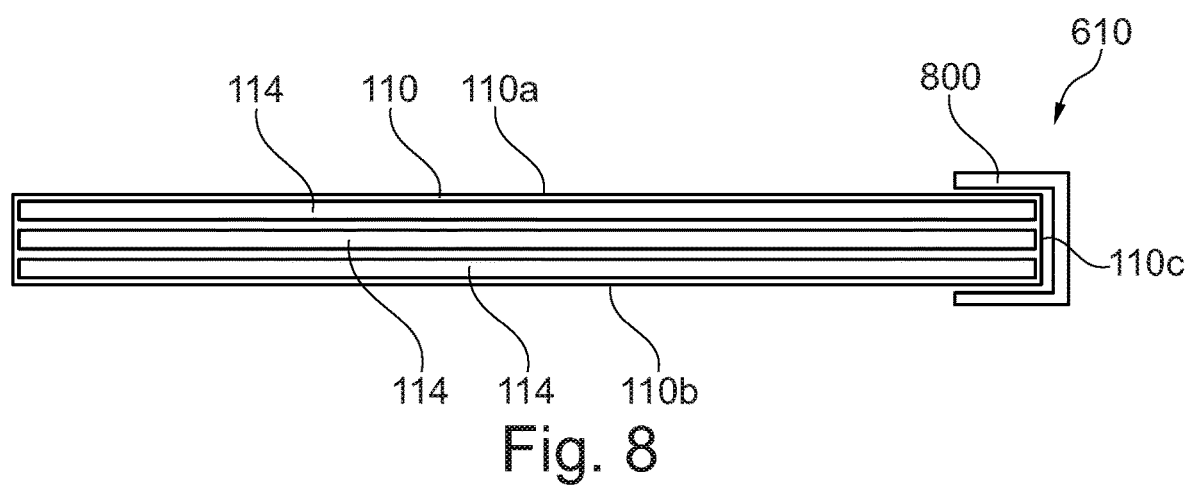
FIG. 8 is a schematic cross-sectional view of another composite component according to the present disclosure.

As shown in FIG. 8, the edge cap 800 may extend at least partially over the front and rear faces 110a, 110b of the body 110, and between the front and rear faces around the edge face 110c.

The edge cap 800 may be made from a resilient material. For example, the edge cap may comprise a metallic material, such as titanium. Alternatively, the edge cap 800 may comprise one or more layers of fibres (and associated matrix material) positioned over the layers of fibres forming the body 110. The edge cap 800 may resist lofting, e.g. separation, of layers 114 of the body 110 at the edge face 110c when the composite component is heated, e.g. by virtue of its resilience. As depicted in FIG. 8, the edge cap 800 may be adhered to the body, e.g. at the front face, rear face and/or the edge face.

Additionally or alternatively to resisting lofting of the layers 114, the edge cap 800 may be configured to restrict vapours that have passed between the layers 114 from being released from the body 110 at the edge face 110c. For example, the edge cap 800 may be configured to create a seal for vapours at the edge face 110c and/or create a tortuous path for vapours being released from the edge face 110c of the body 110. In some arrangements, the edge cap 800 may comprise fire resistant material, e.g. an intumescent coating or paint, a ceramic material, such as fire cement or a ceramic adhesive.

In the arrangement shown in FIG. 8, the edge face 110c of the body 110 is formed substantially perpendicularly to the front face 110a, e.g. where the front face meets the edge face. However, in other arrangements, the edge face 110c of the body 110 may be formed at a non-perpendicular angle relative to the front face 110a, e.g. as described above with reference to FIG. 6, in addition to the edge cap being provided. In such cases, the shape of the edge cap 800 may be configured to match the shape of the edge portion. For example, a part of the edge cap 800 extending across the edge face 110c may extend in a direction parallel with the edge face 110c. Alternatively, the edge cap 800 may extend across the edge face 110c in a direction that is not parallel with the edge face 110c. For example, the edge cap 800 may extend across the edge face 110c in a direction perpendicular to the front face 110a of the body 110.

Returning to FIG. 5, the method 500 may comprise a third step 506 in which one or more fasteners 900 (depicted in FIG. 9) are installed in the edge portion of the body 110.

Figure 9A:
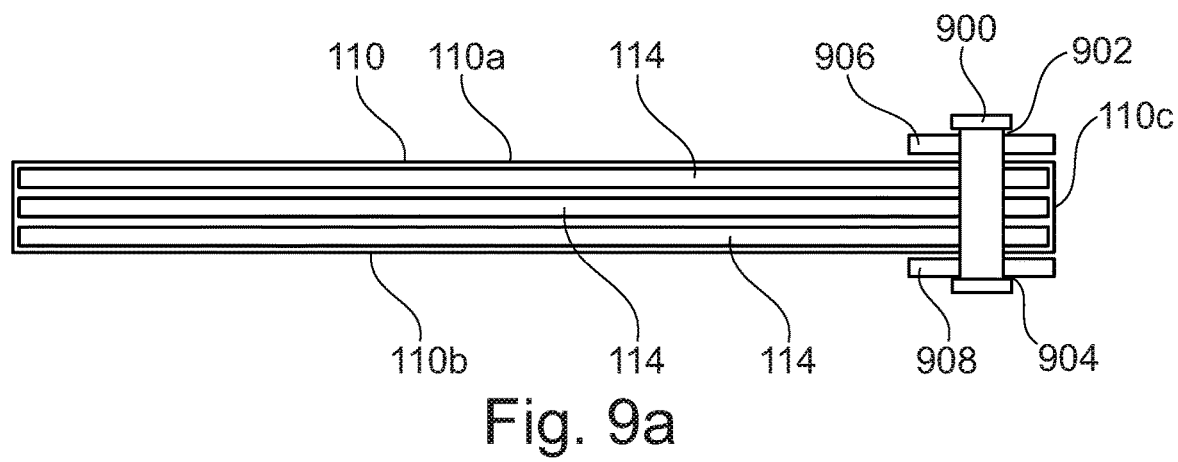
FIG. 9a is a schematic cross-sectional view of another composite component according to the present disclosure.

As depicted in FIG. 9a, the fasteners 900 are arranged to pass through the layered fibres 112 at the edge portion 610 of the body 110, such that the fasteners 900 act to resist separation of the layers 114 of fibres at the edge face 110c. The fasteners 900 may comprise any type of fastener that can be configured to clamp against the front and rear faces 110a, 110b of the body in order to resist separation of the layers 114. For example, the fasteners may comprise rivets or nuts and bolts.

As depicted in FIG. 9a, the fasteners 900 may each comprise a first shoulder 902, arranged to apply a clamping force against the front face 110a of the body 110, and a second shoulder 904 arranged to apply a clamping force against the rear face 110b of the body. When the fasteners 900 comprise a nut and bolt, one of the first and second shoulders 902, 904 may be formed by the nut and the other of the first and second shoulders 902, 904 may be formed by the bolt.

The fasteners 900 may be spaced apart along at least a portion of the length of the edge face 110c, such that the fasteners 900 act to resist separation of the layers along the length or portion of the edge face.

As depicted in FIG. 9a, a first strip of resilient material 906 may be provided over the front face 110a of the body 110 and a second strip of resilient material 908 may be provided over the rear face 110b of the body 110. The strips of resilient material may extend at least partially along the length of the edge face 110c. As depicted, the fasteners 900 may pass through the first and second strips 906, 908 of resilient material. The strips of resilient material may spread the clamping force applied by the fasteners 900 along the length of the edge face 110c in order to resist lofting of the layers of fibres along the edge between the fastener locations. In other arrangements, the first and/or second strips of resilient material 906, 908 may be omitted.

In the arrangement shown in FIG. 9a, the edge face 110c of the body 110 is formed substantially perpendicularly to the front face 110a at the edge. However, in other arrangements, the edge face 110c of the body 110 may be formed at a non-perpendicular angle relative to the front face, e.g. as described above with reference to FIG. 6.

Figure 9B:
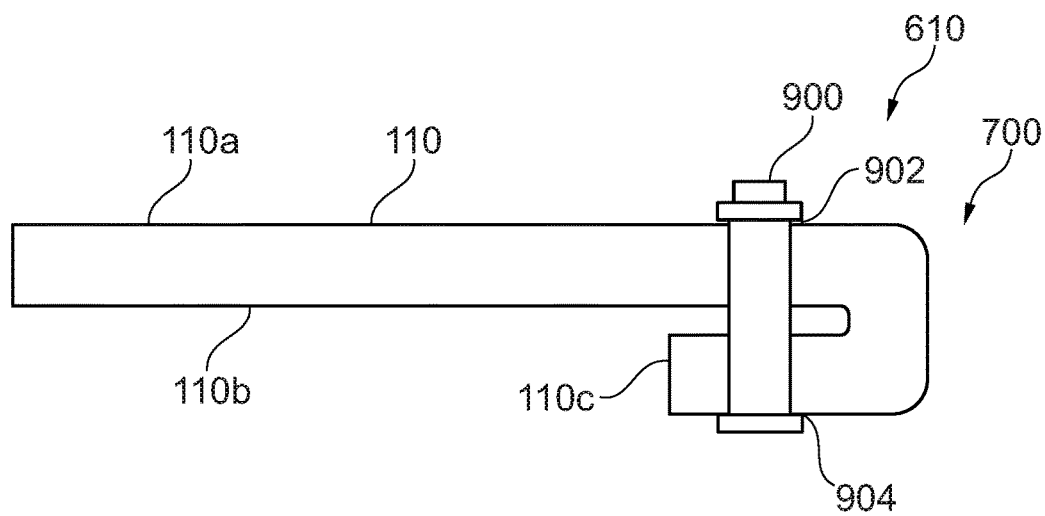
FIG. 9b is a schematic cross-sectional view of another composite component according to the present disclosure.

Furthermore, in the arrangement shown in FIG. 9a, the body 110 does not comprise a bend portion 700, e.g. as depicted in FIGS. 7a and 7b. However, in other arrangements, the body 110 may comprise a bend portion 700 and the fasteners 900 may be arranged to pass through the layers 114 of fibres at the bend portion 700, between the bend portion and the edge face 110*c* or on an opposite side of the bend portion 700 to the edge face 110*c*. As depicted in FIG. 9*b*, when the body 110 portion bends through an angle of approximately 180 degrees at the bend portion 700, the fasteners 900 may be configured to pass through the layers 114 or both sided of the bend portion 700.

It will be appreciated that when the bend portion 7000 bends through an angle of approximately 180 degrees, such that the body 110 is bent or folded back on itself, the first and second shoulders 902, 904 of the fasteners may both act against the front face 110*a* or rear face 110*b* of the body 110. Similarly, in arrangements in which the strips of resilient material 906, 908 are provided, both of the strips may be provided over the front face 110*a* of the body or over the rear face 110*b* of the body, e.g. between the front face 110*a* and the shoulders 902, 904 of the fasteners 900.

Figure 10:
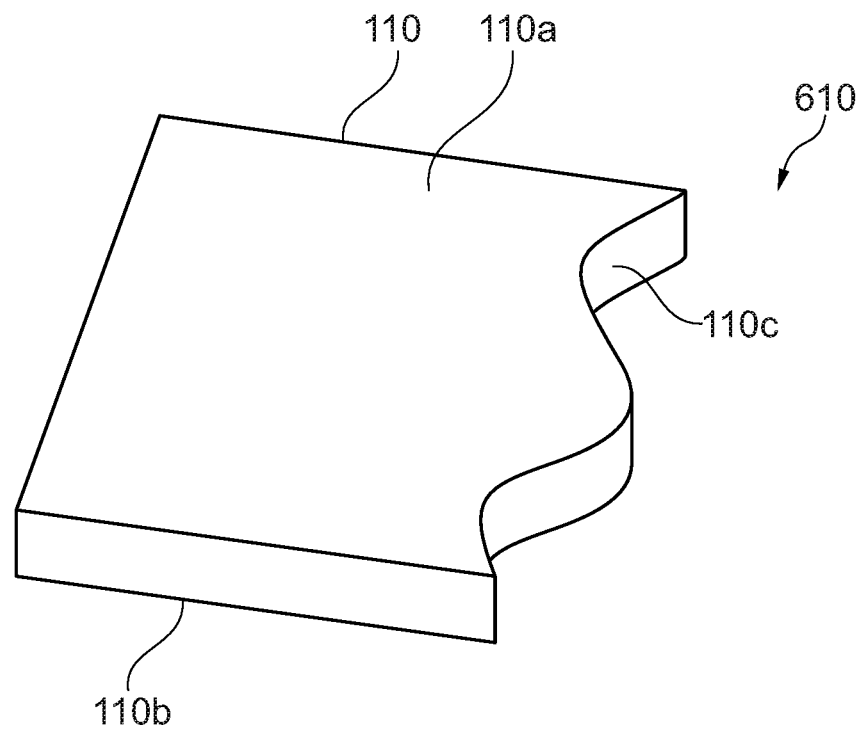
FIG. 10 is a schematic perspective view of another composite component according to the present disclosure.

With reference to FIG. 10, in one or more arrangements of the present disclosure, the edge portion 610 may be shaped such that the edge face 110*c* has an undulating profile along the length of the edge face. Shaping the edge face 110*c* to have an undulating profile may increase the length of the edge face 110*c*, and hence, the local concentration of vapours at a position along the edge face may be reduced.

Shaping the edge portion 610 such that the edge face 110*c* has an undulating profile may be performed in addition to any of the other treatments for controlling local concentration of vapours at the edge face that are described above. For example, the edge portion 610 may be shaped such that the edge face 110*c* has an undulating profile in addition to forming the edge face at a non-perpendicular angle relative to the front face 110*a*, providing an edge cap across the edge face 110*c*, providing one or more fasteners through the layers 114 and/or providing one or more strips of resilient material over the front and/or rear faces 110*a*, 110*b* of the component body 110.

Figure 11:
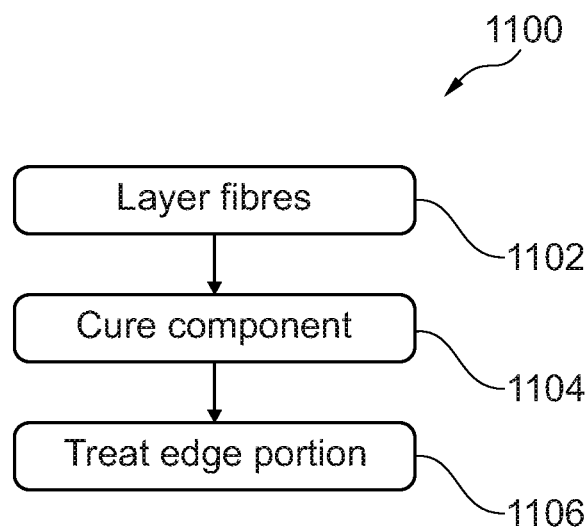
FIG. 11 is a flow chart illustrating a method of manufacturing a composite component.

With reference to FIG. 11, the composite component depicted in FIGS. 6 to 10 and described above may be manufactured using a method 1100. The method 1100 comprises a first step 1102, in which a plurality of fibres are layered to form a body of the composite component. The fibres are layered between a front face and a rear face of the body and an edge face of the body is formed between the front face and the rear face. The edge face is at least partially formed by edges of the layers of fibres. The method 1100 further comprises a second step 1104, in which the composite component is cured.

When performing the method 1100, the composite component may be manufactured such that the edge portion of the body is treated in any of the ways described above with reference to FIGS. 5 to 10. For example, the method 1100 may comprise a third step 1106, in which the edge portion is shaped, e.g. such that the positions of the edges of two or more of the layers of fibres forming the edge face are staggered in a direction parallel to the front face of the body, such that at least a portion of the edge face is formed at a non-perpendicular angle relative to the front face.

The third step 1106 may be at least partially performed prior to the second step 1104. For example, during manufacturing of the composite component, e.g. during the first step 1102, the plurality of fibres may be layered such that the positions of the edges of two or more of the layers of fibres are staggered in a direction parallel to the front face of the body.

Additionally or alternatively, the third step 1106 may be performed at least partially after the second step 1104. For example, the composite component may be machined after the second step 1104, such that the two or more of the layers of fibres forming the edge face are staggered in the direction parallel to the front face of the body. In this way, the edge face, or a portion of the edge face, may be formed at a non-perpendicular angle relative to the front face. In a similar way, the plurality of fibres may be arranged during the first step 1102, and/or the composite component may be machined such that the edge face follows an undulating profile along its length.

In the third step 1106, the edge portion of the composite component may be treated in any of the ways described above with reference to FIGS. 7*a* to 9*b* in order to reduce a burn-on time of the composite component. In some arrangements, the third step 1106 may comprise performing the method 500 described above.

Figure 12:
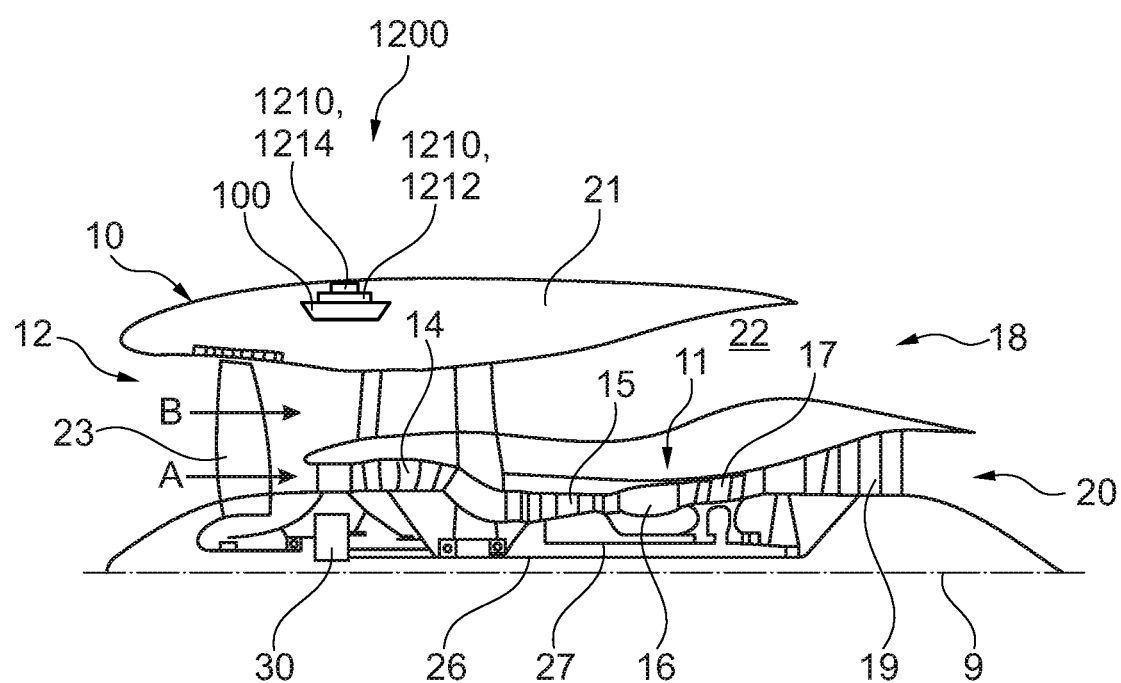
FIG. 12 is a sectional side view of a gas turbine engine comprising an assembly according to the present disclosure.

With reference to FIG. 12, the composite component 100 may form part of an assembly 1200 for an ancillary system of the gas turbine engine 10, such as an electrical system. As depicted in FIG. 12, the assembly 1200 may comprise the composite component 100 and an ancillary component 1210 of the gas turbine engine 10. The assembly 1200 may be arranged about the core 11 of the gas turbine engine 10.

In the arrangement shown in FIG. 12, the assembly 1200 is part of an electrical system of the gas turbine engine, and the ancillary component is an electrical component. However in other arrangements, the assembly may be part of any other ancillary system of the gas turbine engine and the ancillary component may be any other ancillary component.

As depicted in FIG. 12, the electrical component comprises a printed circuit board 1212 mounted on the front or rear face of the composite component body 110. A controller 1214, e.g. of the gas turbine engine 10, is mounted on the printed circuit board 1212.

In the arrangement depicted in FIG. 12, the edge portion of the composite component body 110 has been shaped such that the edge face 110*c* is at a non-perpendicular angle relative to the front face 110*a* of the body. In other arrangements, the composite component body 110 may be shaped by forming an undulating profile along the length of the edge face 110*c*, e.g. as depicted in FIG. 10.

Additionally or alternatively, the edge portion of the composite component provided within the assembly 1200 may be treated by providing an edge cap across the edge, providing one or more fasteners through the layers 114 and/or providing one or more strips of resilient material over the front and/or rear faces 110*a*, 110*b* of the component body 110, in order to reduce the local concentration of vapours at the edge face 110*c*.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of reducing a burn-on time of a composite component after the composite component has been heated, wherein the composite component comprises a body comprising a plurality of layers of fibres layered between a front face of the body and a rear face of the body within a matrix material, wherein the body comprises an edge face between the front face and the rear face at least partially formed by edges of the layers of fibres, wherein the method comprises:

shaping an edge portion of the body in order to control a local concentration of vapours from the matrix material at the edge face of the body, the vapours having been produced during heating of the composite component and having passed between the layers of fibre of the body to the edge face;

wherein the edge portion is shaped such that positions of the edges of two or more of the layers of fibres are staggered in a direction parallel to the front face of the body, such that at least a portion of the edge face is formed at a non-perpendicular angle relative to the front face; and wherein the edge portion is shaped such that the edge face has an undulating profile along a length of the edge face through a full thickness of the edge portion, and the edge portion does not face another edge of the body with mating undulations.

2. The method of claim 1, wherein the edge portion is shaped by machining the edge face after the body of the composite component has been formed.

3. The method of claim 1, wherein the edge portion is shaped by layering the fibres of the body such that the edges of two or more of the layers of fibres are staggered in a direction parallel to the front face of the body prior to curing the composite component.

4. The method of claim 1, wherein shaping the edge portion of the body comprises bending or folding the body of the composite component out of a plane of the front face to form a bend portion extending along the edge portion.

5. The method of claim 1, wherein the method further comprises providing an edge cap extending at least partially over the front face and the rear face, and around the edge face.

6. The method of claim 1, wherein the method further comprises, installing one or more fasteners passing through the layered fibres of the body, such that the fasteners act to resist separation of the layers of fibres at the edge face.

7. The method of claim 6, wherein the method further comprises providing a strip of resilient material over the front and/or rear faces of the body, the strip of resilient material extending at least partially along the length of the edge face, wherein the one or more fasteners pass though the strip of resilient material.

8. The method of claim 6, wherein shaping the edge portion of the body comprises bending or folding the body of the composite component out of a plane of the front face to form a bend portion extending along the edge portion, and the one or more fasteners pass though the body on at least one side of the bend portion.

9. A composite component for a gas turbine engine, the component comprising a body comprising a plurality of layers of fibres layered between a front face of the body and a rear face of the body within a matrix material, the body comprising an edge face between the front face and the rear face at least partially formed by edges of the layers of fibres, and wherein an edge portion of the body is shaped such that a concentration of vapours from the matrix material at the edge face of the body, that are produced during heating of the composite component and pass between the layers of fibre of the body to the edge face, is reduced, wherein the positions of the edges of two or more of the layers of fibres are staggered in a direction parallel to the front face of the body, such that at least a portion of the edge face is formed at a non-perpendicular angle relative to the front face, and wherein the edge portion is shaped such that the edge face has an undulating profile along a length of the edge face through a full thickness of the edge portion, and the edge portion does not face another edge of the body with mating undulations.

10. The composite component of claim 9, wherein the component further comprises one or more fasteners passing through the layered fibres adjacent to the edge face.

11. The composite component of claim 10, wherein the component comprises a strip of resilient material provided over the front and/or rear faces of the body, the strip of resilient material extending at least partially along the length of the edge face, wherein the fasteners pass though the strip of resilient material.

12. The composite component of claim 9, wherein the body comprises a bend portion extending along the length of the edge face, wherein the body bends out of a plane of the front and/or rear face at the bend portion.

13. An assembly for an electrical system for a gas turbine engine, the assembly comprising:

the composite component according to claim 9; and an electrical component coupled to the body.

* * * * *